United States Patent
Dalzell, Jr. et al.

(10) Patent No.: US 6,352,264 B1
(45) Date of Patent: Mar. 5, 2002

(54) ABRADABLE SEAL HAVING IMPROVED PROPERTIES

(75) Inventors: William John Dalzell, Jr., Jupiter; Stuart Alan Sanders; George Lee Crawford, both of Palm Beach Gardens; Frederick Clell Walden, Jensen Beach, all of FL (US); William J. Woodard, Kingwood, TX (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 09/466,117

(22) Filed: Dec. 17, 1999

(51) Int. Cl.⁷ .................................................. F16J 15/54
(52) U.S. Cl. .................... 277/415; 277/936; 415/173.4; 415/173.6
(58) Field of Search .................... 277/415, 936, 277/944; 415/173.4, 173.6, 173.5, 174.4, 174.5; 428/553, 652, 654, 937

(56) References Cited

U.S. PATENT DOCUMENTS

| 3,547,455 A | * 12/1970 | Daunt ....................... 277/415 |
| 4,696,855 A |   9/1987  | Pettit, Jr. et al. ........ 428/312.8 |
| 4,936,745 A |   6/1990  | Vine et al. ................ 415/173.4 |
| 5,196,471 A | *  3/1993 | Rangaswamy et al. ..... 428/403 |
| 5,472,315 A | * 12/1995 | Alexander et al. ........ 415/173.4 |
| 5,536,022 A |   7/1996  | Sileo et al. ............. 277/235 A |
| 5,584,897 A | * 12/1996 | Christianson et al. .......... 51/295 |
| 5,706,231 A |   1/1998  | Kokubo ..................... 365/200 |

* cited by examiner

*Primary Examiner*—Lynne H. Browne
*Assistant Examiner*—Enoch E. Peaver
(74) *Attorney, Agent, or Firm*—F. Tyler Morrison

(57) ABSTRACT

An air seal for use in a gas turbine engine is disclosed. The seal includes a seal substrate, and an abradable layer on the substrate, with the abradable including a thermoset polymer and a thermoplastic polymer. The abradable may also include a filler to add porosity, or provide lubrication, to enhance abradability.

19 Claims, 3 Drawing Sheets

ABRADABLE SEAL HAVING IMPROVED PROPERTIES

CROSS REFERENCE TO RELATED APPLICATION

Some of the material disclosed herein is also disclosed and claimed in co-pending and commonly-owned application Ser. No. 09/466,255 "Method of Producing Abradable Seal Having Improved Properties" and filed on even date herewith.

BACKGROUND OF THE INVENTION

The present invention relates generally to air seals for gas turbine engines, and relates more particularly to seals having improved properties in operating conditions during which unusually large amounts of seal material is liberated and ingested into the engine.

Gas turbine engines are well known sources of power, e.g., motive power for aircraft or as power generators, and generally include compressor (typically preceded by one or more fan stages), combustor and turbine sections. As illustrated generally in FIG. 1, compressor and turbine sections (and any fan stages) each include shaft-mounted, rotating disks 1, each carrying a set of blades 2 located within a hollow housing or case 3, with intervening sets of stationary vanes 5 mounted to the case. Air seals 4, 7 are provided between the tips of the blades and the case (outer air seals), and between the vanes and the disks (knife edge seals) to prevent air leakage between those components.

Air is ingested through an engine inlet and compressed by rotating disks and associated blades in the compressor. The compressed air is then burned with fuel in the combustor to generate high pressure and temperature gasses, which cause rotation of the turbine sections and associated fan compressor stages and are then ejected out an engine exhaust to provide thrust. The case is intended to prevent leakage of air or combustion products around the tips of the blades, i.e., between the blade tips and the case, which leakage reduces the efficiency of the engine.

Despite the design of components to minimize leakage, a substantial proportion of any leakage which does occur in a normally-operating gas turbine engine occurs between the tips of the blades and the case, and between the tips of the vanes and the disks. One manner of eliminating such leakage is to fabricate all mating parts to extremely close tolerances, which becomes increasingly expensive as tolerances are reduced. Moreover, given the temperature ranges to which the parts are subjected to before, during and after operation, and the resultant thermal expansion and contraction of the parts, such close tolerances will at times result in interference between mating parts and corresponding component wear and other damage. Accordingly, gas turbine engine designers have devoted significant effort to developing effective air seals, and particularly seals composed of abradable materials. See, e.g., U.S. Pat. No. 4,936,745 to Vine et al. and U.S. Pat. No. 5,706,231 to Nissley et al., which are assigned to the assignee of the present invention and expressly incorporated by reference herein.

Seals require a balance of several properties including relative abradability upon being contacted by a rotating blade tip, erosion resistance, durability, thermal expansion balanced with that of the underlying material, and relative ease and reasonable cost of manufacture. See, e.g., U.S. Pat. No. 5,536,022 to Sileo, which is also assigned to the assignee of the present invention and expressly incorporated by reference herein.

A typical compressor air seal includes the seal substrate, e.g., a metal substrate, an optional metal layer composed of a metal powder plasma sprayed on the substrate, and an abradable, sealing layer applied to the metal layer. Typical sealing layers include a metal matrix of aluminum and silicon with some amount of embedded polyester powder particles and is plasma sprayed onto the substrate, as well as silicone rubber abradable layers incorporating material such as Visilox V-622 from Rhodin of Troy, N.Y. and hollow microspheres. These systems provide adequate performance up to about 500° F. While these seal systems have provided adequate performance to date, there remains a desire for a seal system having a higher temperature capability, compatible thermal expansion with the underlying substrate, improved erosion resistance yet readily abrades when contacted by a blade tip of knife edge, and so on.

Moreover, with the desire to reduce the weight of gas turbine engines, particularly for use with aircraft, the use of composite cases for various engine stages has been proposed. In this instance, the use of plasma spray deposition processes is undesirable if not unusable. Accordingly, another type of seal system must be employed.

It is an object of the present invention to provide a gas turbine engine air seal that provides the desired improved performance over present air seals.

It is another object to provide such a seal that is also cost effective.

It is yet another object to provide a seal that weighs no more than conventional seal material, and provides no weight penalty.

It is still another object to provide a seal that can be readily applied to composite substrates.

It is still yet another object to provide such a seal using conventional equipment.

SUMMARY OF THE INVENTION

According to one aspect of the present invention, an air seal is disclosed for use in a gas turbine engine. The seal includes a seal substrate, and an abradable seal layer on to the substrate. The abradable layer includes at least a thermoset polymer bulk material such as a phenolic powder and a thermoplastic binder material such as PEEK. The abradable layer may also include a filler to provide some desired characteristic, such as porosity or dry lubrication to enhance abradability.

One advantage of the present invention is that the seal provides improved acceptable durability and abradability, particularly at higher temperatures. In addition, seal of the present invention is cost effective to produce, and does not weigh any more than conventional seal materials.

Additional advantages will become apparent to those skilled in the art ill light of the following description and accompanying drawings.

DETAILED DESCRIPTION OF THE PREFERRED EMBODIMENTS

According to one embodiment of the invention, the seal is plasma sprayed onto a seal substrate. While the seal substrate is typically a metal, such as a titanium alloy or a superalloy material, the present invention may also be applied to composite seal substrates. The seal material includes a thermoset polymer as a primary or bulk phase and a thermoplastic polymer as a secondary or binder phase. Preferably, the primary or bulk phase is composed of a material that is stable to a temperature of at least 500 F., and the secondary or binder phase has a melting temperature in excess of 600 F. Optional additions or fillers include porosity additions, for example via hollow spheres (glass or carbon materials) dry lubricants such as $MoSi_2$, PTFE or graphite. Representative compositions in volume percent are 40–80% for the bulk phase, 20–60% for the binder phase, and 0–30% of the filler.

The thermoset material is typically durable, but typically has an upper temperature limit when used in bulk, for example less than about 350 F. or 400 F. during application processes and thus it is not possible to heat the thermoset material sufficiently to apply by plasma spray. Accordingly, thermoset materials have not previously been incorporated into plasma sprayed abradable coatings. When plasma sprayed in accordance with the present invention, care is taken to ensure that the thermoset material is not heated too much, since the thermoset material will burn; however, if too low a temperature is used the material will not soften sufficiently to build up on the substrate. Accordingly, the thermoplastic material used. The thermoplastic material is also selected to provide the seal with sufficient higher temperature stability, e.g., up to and in excess of 500 F. depending upon the anticipated service temperature(s) of the seal. The filler material provides porosity or lubrication to enhance abradability or some other desired characteristic.

Exemplary thermoset materials include Fina met phenolic powder (from Mark V Laboratories of East Granby, Conn.), with higher temperature applications including materials such as polyimides (Vespel® SP21 from DuPont of Wilmington, Del.), fluorinated polyimides (Avimid®N from Cytec of Havre de Grace, Md.), and polybenzimidazoles (Celazole® U-60 from Celanese Ltd. Of Dallas, Tex.). Other thermoset materials can also be used.

Exemplary thermoplastic materials includes polyarylether (PEEK™ [polyetheretherketone] from Victrex USA of York, Pa.), polyetherimide (Ultem® PEI from GE Polymerland of Huntersville, N.C.) and polyamide-imide (Torlon® from BP Amoco Chemicals of Greenville, S.C.).

Exemplary hollow spheres include glass microspheres (Q-Cell 2135 from PQ Corporation of Philadelphia, Pa.) and carbon microspheres (Carbosphere Type D from Carbospheres, Inc. of Fredericksburg, Va.).

Figure 1:
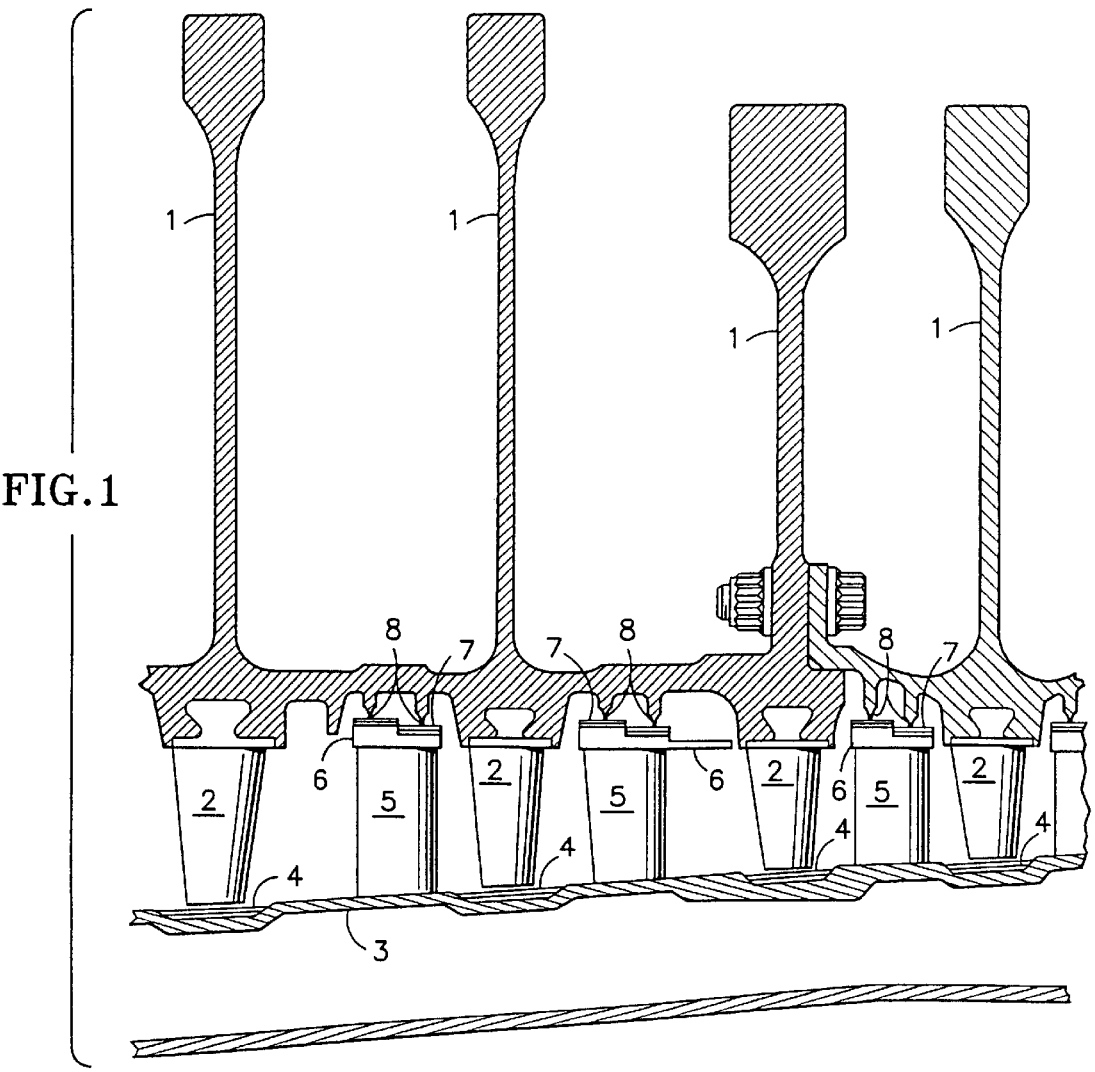
FIG. 1 is a cross sectional view of a portion of a typical gas turbine engine.
Figure 2:
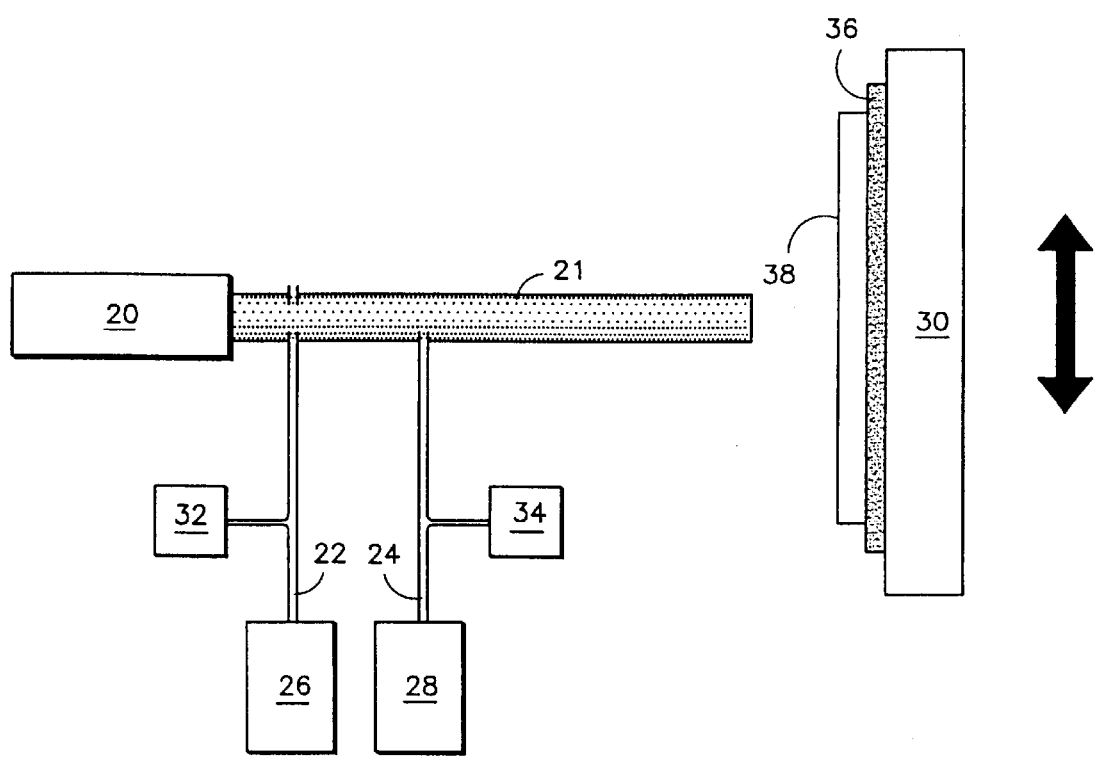
FIG. 2 is a schematic view of a plasma torch for producing the seal in accordance with the present invention.

Turning now to FIG. 2, a plasma spray apparatus includes a torch 20 (including a power source and spray head, neither shown separately from the apparatus generally), and at least two powder delivery lines 22, 24. The torch preferably is capable of simultaneously delivering and spraying at least two separate powders into a flame 21, see, e.g., commonly-owned U.S. Pat. No. 4,696,855 to Pettit, Jr. et al, which is expressly incorporated by reference herein. The lines 22, 24 are coupled respectively to powder material hoppers 26, 28 which contain the powder to be deposited onto a substrate 30, and respective sources 32, 34 of carrier gas such as argon, which deliver the powder from the hoppers into the plasma torch plume. Typical substrate materials include titanium alloys, as well as nickel base, cobalt base and iron base superalloys and combination of these materials, although the present invention may also be used with composite substrate materials, and is not intended to be limited to such materials. The seal may include a bond layer 36 (illustrated in FIG. 2 but preferably does not include such a layer. The layer 36 might be used, for example, in connection with a metal substrate to grade from the metal to a composition similar to that of the abradable layer to be applied to the substrate. Plasma spray apparatus generally are known in the art, and accordingly have not been described in detail herein. We have used a model 7MB3 manufactured by Sulzer-Metco to produce seals in accordance with the present invention. While present invention is described in connection with an outer air seal, it may be equally applied to a knife edge scat (e.g., FIG. 1 at 7, 8), or other suitable application.

The powder material which forms an abradable layer 38 is preferably co-deposited, e.g., introduced separately into the plasma, but we have also used blended powder. Co-depositing enables the relative amounts of bulk, binder and filler to be adjusted as desired. Preferably a combination of argon and hydrogen is used as the arc gas.

The bulk phase powder is stored in a hopper 26, and a carrier gas such as argon or nitrogen is provided from a source such as the source 32, to carry the powder through a line such as line 22, to introduce the powder to the torch 20. The binder phase powder is stored in a hopper 28, and a carrier gas such as argon or nitrogen is provided from a source such as the source 34, to carry the powder through a line such as line 24, to introduce the powder into the spray stream produced by the torch 20 downstream of the bulk powder. The bulk and binder phases are deposited on the substrate to form the abradable layer 38 to a desired thickness (preferably uniform) plus some excess thickness (typically at least 0.025 inch) to allow for subsequent machining of the seal.

An optional, additional step is to include filler (or some other material such as lubricant (into) the abradable layer 38, to produce a seal having porosity.

Figure 3A:
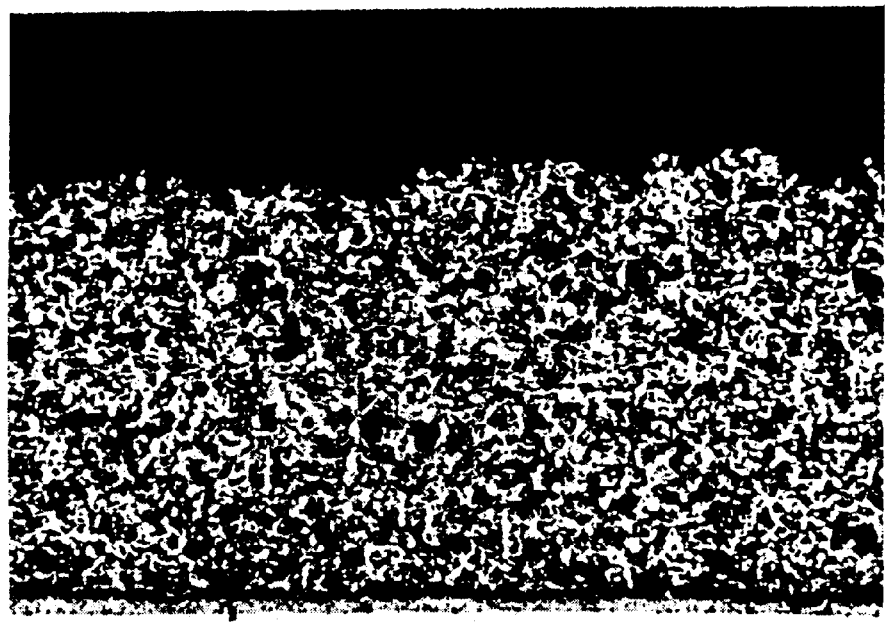
FIGS. 3a and 3b are photomicrographs of an abradable material in accordance with the present invention.
Figure 3B:
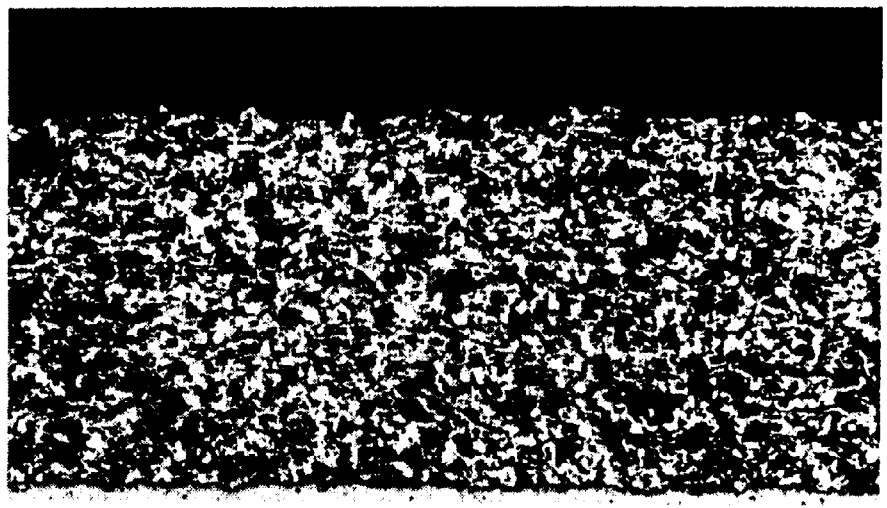

As an example, several trials were run using a Sulter Metco 7MB3 plasma spray torch with GP electrode assembly, at 500 amps and 60–70 volts, with a primary gas of argon at a flow rate of about 87 standard liters/minute (SLPM), a secondary gas of hydrogen at a flow rate of about 2–3 SLPM, and a gun to workpiece distance of about 3.5 inches. For pure polymer abradables (no hollow spheres), we have varied mixtures which resulted in ratios of PEEK/Phenolic between about 60:40 and 90:10. While each of the samples was deemed acceptable, different application might require different compositions. Rub rig test results indicated that the higher % PEEK samples were acceptable, but increased blade loading. Exemplary microstructures of plasma sprayed materials are illustrated in FIGS. 3a and 3b, with FIG. 3a showing a lower density seal material and FIG. 3b showing a higher density seal material.

In an alternate embodiment, the present invention may be molded separately, and then bonded to the seal substrate. The powders, including filler(s) as desired are blended and inserted into a die cavity generally defining the shape of the abradable layer. The mold and blended powder are heated and the dies are brought together to form the abradable layer. The temperature and pressure are selected to soften but not burn or damage the polymer materials. Alternatively, the powders may be plasma sprayed, as above, into a mold to build up the seal in the mold, with the mold having been treated with a release agent such as salt, e.g., sodium chloride, or boron nitride to facilitate seal removal. In the case of salt, concentrated formula is mixed and applied to a substrate. A very rough pure SALT surface is obtained on the mold surface, and plasma spray coatings tend to adhere very well to the salt. The coating is applied and built up, e.g., by plasma spraying. The seal and mold are then submerged in moving water—which dissolves the SALT and releases the molded seal.

Several samples were prepared by placing the above PEEK and Fina-met phenolic powders and hollow spheres in molds and heating the molds and powder to about 675° F. and consolidating the powder at about 100 psi for 15 minutes.

| Sample | PEEK | Phenolic | Glass spheres | Carbon spheres |
|--------|------|----------|---------------|----------------|
| 1 | 30 | 70 | — | — |
| 2 | 24 | 56 | 20 | — |
| 3 | 40 | 40 | 20 | — |
| 4 | 29 | 66 | 5 | — |
| 5 | 40 | 40 | — | 20 |

Alternatively, the seals may be molded in an autoclave, or molded on the seal substrate in situ using pressure rollers. If needed, a heat source such as an external heater or plasma torch is provided.

The molded abradable layer is then removed from the molds and is preferably adhesively bonded to the seal substrate using such exemplary adhesives as epoxies (FM300 from Cytec of Havre de Grace, Md.), nitrile-phenolic (AF 30 from 3M Aerospace Materials of St. Paul, Minn.), and silicones (RTV159 from GE Silicones of Waterford, N.Y.). The adhesive is selected to be appropriate for the service temperature of the intended seal system, and such that curing temperatures and/or pressures do not compromise the integrity of the molded abradable seal. Surface preparation of the seal substrate for bonding is accomplished by one or more methods including abrasive roughening (hand-sanding, grit-blasting) followed by cleaning with non-contaminating low-residue solvent (acetone, ethyl or isopropyl alcohol). Bonding may be enhanced by the employment of various electrochemical etching procedures (chromic or phosphoric acid), which procedures are typically considered to follow industry standards.

Testing of the present invention using the samples described above, as plasma sprayed and also as molded and adhesively bonded to a seal substrate has been favorable. Both versions of the inventive seal exhibit erosion resistance at least as good as conventional metallic abradable seals composed of aluminum and silicon with polyester. The seals also exhibit abradability at least as good at conventional, porous silicone rubber seal seals.

An advantage of the present invention is that the seal provides both acceptable durability and abradability, and also provides these features at higher temperatures. In addition, seal of the present invention is cost effective, and does not weigh any more than conventional seal materials. The seal of the present invention can be applied using conventional plasma spray apparatus, and the process of providing such a seal that enables adjustment of the proportion of metal and of filler, to provide an optimal seal adapted for different operating conditions. Alternatively, the inventive seal can be applied by molding the seal and then bonding the seal to a substrate, or by molding the seal in situ.

While the present invention has been described above in some detail, numerous variations and substitutions may be made without departing from the spirit of the invention or the scope of the following claims. Accordingly, it is to be understood that the invention has been described by way of illustration and not by limitation.

What is claimed is:

1. An air seal for use in a gas turbine engine having improved durability, comprising:

a seal substrate; and an abradable seal layer on to the substrate, the abradable layer composed of a thermoset polymer bulk material and a thermoplastic binder material.

2. An air seal as in claim 1, wherein the abradable layer composed in volume percent of between about 40–80% thermoset material and about 60–20% thermoplastic material.

3. An air seal as in claim 1, wherein the abradable layer has a microstructure characterized by splats built up on one another.

4. An air seal as in claim 1, wherein the abradable layer further comprises up to about 30% filler material.

5. An air seal as in claim 4, wherein the filler material is capable of providing porosity.

6. An air seal as in claim 4, wherein the filler composed of hollow spheres having a melting point above the intended service temperature of the seal.

7. An air seal as in claim 4, wherein the filler material is capable of providing lubrication.

8. An air seal as in claim 1, wherein the air seal is an outer air seal.

9. An air seal as in claim 1, wherein the air seal is a knife edge seal.

10. An air seal as in claim 1, wherein the thermoset material is stable up to at least 500 F.

11. An air seal as in claim 1, wherein the thermoplastic material has a melting temperature above about 600 F.

12. A gas turbine engine seal system comprising:

a seal assembly having a seal substrate; and an abradable layer applied to a bond layer, the abradable layer composed of a thermoset polymer, bulk material and a thermoplastic polymer binder material; and an engine component adapted for motion relative to the seal assembly and having an abrasive portion interacting with the abradable seal material, the abrasive portion of the component and the abradable layer of the seal assembly cooperating to provide sealing.

13. A seal system as in claim 12, wherein the abradable layer is composed in volume percent of between about 40–80% thermoset material and about 60–20% thermoplastic material.

14. A seal system as in claim 12, wherein the abradable layer has a microstructure characterized by splats built up on one another.

15. A seal system as in claim 12, wherein the abradable layer further comprises up to about 30% filler material.

16. A seal system as in claim 12, wherein the filler material is capable of providing porosity.

17. A seal system as in claim 12, wherein the filler material is capable of providing lubrication.

18. A seal system as in claim 12, wherein the air seal is an outer air seal.

19. A seal system as in claim 12, wherein the air seal is a knife edge seal.

* * * * *